US009892416B2

(12) United States Patent
Shoham

(10) Patent No.: US 9,892,416 B2
(45) Date of Patent: Feb. 13, 2018

(54) AUTOMATED AGENT FOR SOCIAL MEDIA SYSTEMS

(75) Inventor: Yoav Shoham, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 900 days.

(21) Appl. No.: 13/617,824

(22) Filed: Sep. 14, 2012

(65) Prior Publication Data

US 2013/0013713 A1    Jan. 10, 2013

Related U.S. Application Data

(62) Division of application No. 12/821,056, filed on Jun. 22, 2010.

(60) Provisional application No. 61/297,651, filed on Jan. 22, 2010.

(51) Int. Cl.
```
G06Q 10/00      (2012.01)
G06Q 30/02      (2012.01)
H04L 12/58      (2006.01)
G06Q 10/10      (2012.01)
```

(52) U.S. Cl.
CPC ......... *G06Q 30/02* (2013.01); *G06Q 30/0283* (2013.01); *G06Q 10/10* (2013.01); *H04L 51/046* (2013.01)

(58) Field of Classification Search
USPC ....................................................... 705/319
See application file for complete search history.

(56) References Cited

U.S. PATENT DOCUMENTS

| | | | |
|---|---|---|---|
| 2006/0101508 A1* | 5/2006 | Taylor | 726/7 |
| 2008/0040474 A1 | 2/2008 | Zuckerberg et al. | |
| 2008/0091692 A1* | 4/2008 | Keith | G06F 17/3089 |
| 2008/0228821 A1 | 9/2008 | Mick et al. | |
| 2009/0006415 A1 | 1/2009 | McAniff et al. | |
| 2009/0144075 A1 | 6/2009 | Flinn et al. | |
| 2009/0204649 A1 | 8/2009 | Wong et al. | |
| 2009/0241035 A1 | 9/2009 | Tseng et al. | |
| 2009/0241160 A1* | 9/2009 | Campagna | H04N 7/17318 725/131 |
| 2010/0023506 A1 | 1/2010 | Sahni et al. | |

(Continued)

FOREIGN PATENT DOCUMENTS

WO    WO2011091116 A3    11/2011

OTHER PUBLICATIONS

International Application Serial No. PCT/US2011/021829, International Search Report dated Sep. 28, 2011, 5 pages.

(Continued)

*Primary Examiner* — Garbrielle A Mccormick
(74) *Attorney, Agent, or Firm* — Patent Law Works LLP

(57) ABSTRACT

A method to automatically process social media data includes capturing captured data, describing actions and/or context relating a user across multiple social media systems. The captured data is stored within a database. One or more interfaces are provided in order to provide access to the stored captured data. A rules database is configured to store multiple social media rules (e.g., behaviors) that may be associated with a user. A behavior engine is configured to perform autonomous activities, on behalf of a user with respect to multiple social media platforms, based on the social medial rules and/or the captured data.

20 Claims, 9 Drawing Sheets

(56) References Cited

U.S. PATENT DOCUMENTS

2011/0145050 A1* 6/2011 Gross et al. ............... 705/14.25

OTHER PUBLICATIONS

International Application Serial No. PCT/US2011/021829, Written Opinion dated Sep. 28, 2011, 3 pages.
"Bringing Second Life to Life: Researchers Create Character with Reasoning Abilities of a Child", http://www.physorg.com/news124368610.html, (Jan. 18, 2010), 12 pages.
"Goal Oriented Intelligent Agents Evolving in Virtual Worlds", [online] Evil-Limited, Research Notes, (2007), 5 pages.
"Intelligent Avatars", [online] http://inteliwise.blogspot.com/2008/01/intelligent-avatar-insecond-life.html, (Posted on Jan. 23, 2008), 3 pages.
"Welcome to Collectedin.com!", Collectedin Community, (Mar. 24, 2010), 1 pg.
Anastassakis, George, et al., "Virtual Agent Societies with the mVITAL Intelligent Agent System", A. de Antonio, R. Aylett, and D. Bailin (Eds.): IVA 2001, LNAI 2190, (2001), pp. 112-125.
Duncan, Geoff, "AIs May Call Virtual Worlds Home", [online] http://www.digitaltrends.com/gaming/ais-may-call-virtual-worlds-home.html, (Sep. 13, 2007), 4 pages.
Friedman, Doron, et al., "Spatial Social Behavior in Second Life", In Intelligent Virtual Agents. Lecture Notes in Computer Science, vol. 4722/2007, ISSN:0302-9743 (Print) 1611-3349 (Online), (Sep. 4, 2007), pp. 252-263.
Goertzel, Ben, et al., "An Inferential Dynamics Approach to Personality and Emotion Driven Behavior Determination for Virtual Animals", The Reign of Cats and Dogs, (2008), 5 pages.
Goertzel, Ben, "The Collective Pet Unconscious: Balancing Intelligence and Individuality in Populations of Learning Enabled Virtual Pets", ACM 978-1-60558-246-7/09/04, (Apr. 4-9, 2009), 4 pages.
Hattori, Fumio, et al., "Socialware: Multiagent Systems for Supporting Network Communities", NTT Communication Science Laboratories, Kyoto Japan, (1999), 5 pages.
Lerman, Kristina, "Social Networks and Social Information Filtering on Digg", University of Southern California, Information Sciences Institute, (Dec. 7, 2006), 8 pages.
Ley, Michael, "Intelligent Virtual Agents", [online] http://informatik.unitrier.de/~ley/db/conf/iva/index/.html; Ruttkay et al. (Eds.): Intelligent Virtual Agents, 8th International Conference, IVA 2009, Amsterdam Netherlands, Sep. 14-16, 2009, Proceedings. Lectures in Computer Science 5773, (Jan. 18, 2010), 2 pages.
Partsakoulakis, I., et al., "Agent-Enhanced Collaborative Activity in Organized Settings", International Journal of Cooperative Information Systems, 15(1), ISSN: 0218-8430, (2006), pp. 119-154.
Partsakoulakis, Ioannis, et al., "Representative Agents for Reliable Participation in Social Contexts", CEAS (ECAI 2004 Workshop, (2004), 7 pages.
Pash, Adam, "Three Social Media Aggregators That Bring It All Together", PC World, (Aug. 3, 2009), 5 pages.
Sawamoto, Jun, et al., "Evaluation of Multi-Agent Model for Community Formation in Network Society", AINA Archive: Proceedings of the 18th International Conference on Advanced Information Networking and Applications—vol. 2, (2004), 131.
Silverman, Jacob, "Will artificial intelligence invade Second Life?", [online] From HowStuffWorks.com. http://electronics.howstuffworks.com/artificial-intelligence-secondlife.htm, (Sep. 21, 2007), 3 pages.
Advanced Information Networking and Applications—vol. 2, 2004, 131.
Hattori et al. ("Socialware:Multiagent System for Supporting Network Communities". NTT Communication Science Laboratories, Kyoto, Japan (1999).

* cited by examiner

AUTOMATED AGENT FOR SOCIAL MEDIA SYSTEMS

CROSS-REFERENCE TO RELATED PATENT DOCUMENTS

This patent application is a divisional of U.S patent application Ser. No. 12/821,056, filed on Jun. 22, 2010, which claims the benefit of priority, under 35 U.S.C. Section 119(e), to Yoav Shoham, U.S. Provisional Patent Application Ser. No. 61/297,651, entitled "Programmable Smart Avatars," filed on Jan. 22, 2010, which are incorporated by reference in their entirety.

TECHNICAL FIELD

This patent document pertains generally to data processing systems and methods and more particularly, but not by way of limitation, to methods and systems to process data pertaining to a user across multiple social media.

BACKGROUND

The number of social media platforms with which users interact has proliferated over the past few years. Examples of such social media platforms include social networking systems (e.g., Facebook), professional networking systems (e.g., LinkedIn), virtual world platforms (e.g., Second Life), messaging systems (e.g., Google email (Gmail), Google Wave, Skype), blogging systems (e.g., Blogspot.com), and review/rating systems (e.g., Yelp.com, Digg.com). Social networking platforms, such as Facebook, are continuing to gain popularity as platforms on which users interact, communicate and share using multiple types of data and communication channels. For example, a number of social networking platforms provide one or more messaging tools, and photo and video sharing capabilities. These social networking platforms also allow users to share content located on the Internet with each other in a convenient manner, and provide mechanisms by which users can exercise control over with whom they share information, and what information is shared with them (e.g., by source or by content type).

Virtual worlds similarly host vibrant communities of people who interact, play, do business and even find romance online.

This proliferation has presented a number of challenges to users, both from a resource perspective (e.g., the time required to manage interactions across multiple social media platforms) and technical perspective (e.g., having to learn user interfaces and privacy controls across multiple platforms). For example, managing interactions across multiple social media platforms may require a user to duplicate actions (e.g., the publication of updates or other information). A particular user may also be presented with duplicate information from other users, via a number of social media platforms (e.g., when a user publishes the same information on both Facebook and MySpace). Reacting to such communications and events across multiple social media platforms may require more time than a user is willing or able to expend on social networking activities.

Consider also that privacy controls across multiple social media platforms may vary substantially. It is burdensome for a user to have to learn and master various types and flavors of privacy controls that are provided by multiple social media platforms. Indeed, it is not uncommon for a user, as a result of a lack of understanding of privacy controls, to have a certain of their information published to unintended recipients via a social media platform. Particularly as the complexity of social media platforms has increased (e.g., as a result of the opening of such platforms to third-party developers and applications), the challenge of exercising a desired degree of privacy control across multiple platforms has become daunting to many users.

Notwithstanding the challenges presented above, many users desire to maintain an active presence on their social platforms, and to be actively engaged with their social networks on a regular basis.

Hattori et al., in their paper entitled "*Socialware: Multi-agent Systems for Supporting Network Communities*", discussed their development of multi-agent systems to assist in various social activities on network communities, which they term "socialware". Hattori et al. described a network community as a collection of personal units, community agent(s) and a set of relationships between them. A personal unit is described as consisting of a user and his or her personal agent. Each personal agent can help the user by gathering and exchanging information, visualizing contexts, and recommending or assisting the user in making a particular choice. The personal agents of a user may cooperate and act as a unit, with the user being the central figure. The community of agents has the function of providing shared information, knowledge or context within a community, and act as mediators for informal communications between people. An architecture where each user has personal agents that communicate with each other enables the community to spread. Hattori et al. states that it is possible to have some agents be domain-specific (for example, an information retrieval agent specialized for financial news) and others to be more generic (for example, an interface agent for navigating and reading documents).

Adoption of multiple aspects of a user and the user's changes in interests can be achieved by changing the system dynamically and autonomously. For example, a domain-specific agent can clone itself and produce a new agent that makes additional communication channels when the user's interest has changed.

Hattori et al. furthermore described the development of a prototype application for the purposes of linking people (a "CommunityOrganizer"), which consists of a personal agent for each user, and a community agent. Each personal agent functions to acquire the user profile and to visualize potential communities around a user. The community agent functions to collect the user profiles, and to maintain the information on potential communities. The relevancies between users are calculated by the community agent from the users' profile data. These profiles can be obtained from each user's input, from archives of mailing lists using keyword extraction techniques, or from user information on the Web. Each personal agent is furthermore described as having slide bars which temporarily adjust the weightings of the viewpoints, since a degree of common interest consists of multiples aspects. Each personal agent displays structures of discussions according to the user's interests. The community agent may have to classify messages according to several criteria, such as topic, time and reputation.

Partsakoulakis et al., in their paper entitled "*Representative Agents for Reliable Participation in Social Contexts*", describe a prototype system geared towards empowering humans to deliberately form and manage their social context and position via personal agents that act as their representatives. Personal agents are described as representing humans, and form their "digital analog" within organizations. The approach is based on a role-based model concerning consistency and reliability of role playing within a social context. Agents are described as being aware of an overall social context, profile and needs of their users, and may search for, evaluate (e.g., in terms of consistency), and present relevant information to their users. Personal agents serve/represent specific humans and populate groups that play organizational roles. Personal agents are described as maintaining the profiles of the humans that they represent (e.g., their preferences, their roles, etc.) to help them achieve their goals. Personal agents can have managerial responsibilities within an organization, and their architecture is described as comprising a knowledge base, an inference engine, and an interface of the agent with its environment. Two types of interfaces are distinguished, namely the interface between the agent and the user, and the interface between the agent and other agents. The knowledge base of personal agent is described as comprising the social context in which the agent operates, the profile of the user, and a cache of addresses of other agents.

BRIEF DESCRIPTION OF DRAWINGS

Some embodiments are illustrated by way of example and not limitation in the figures of the accompanying drawings in which.

DETAILED DESCRIPTION

Figure 1:
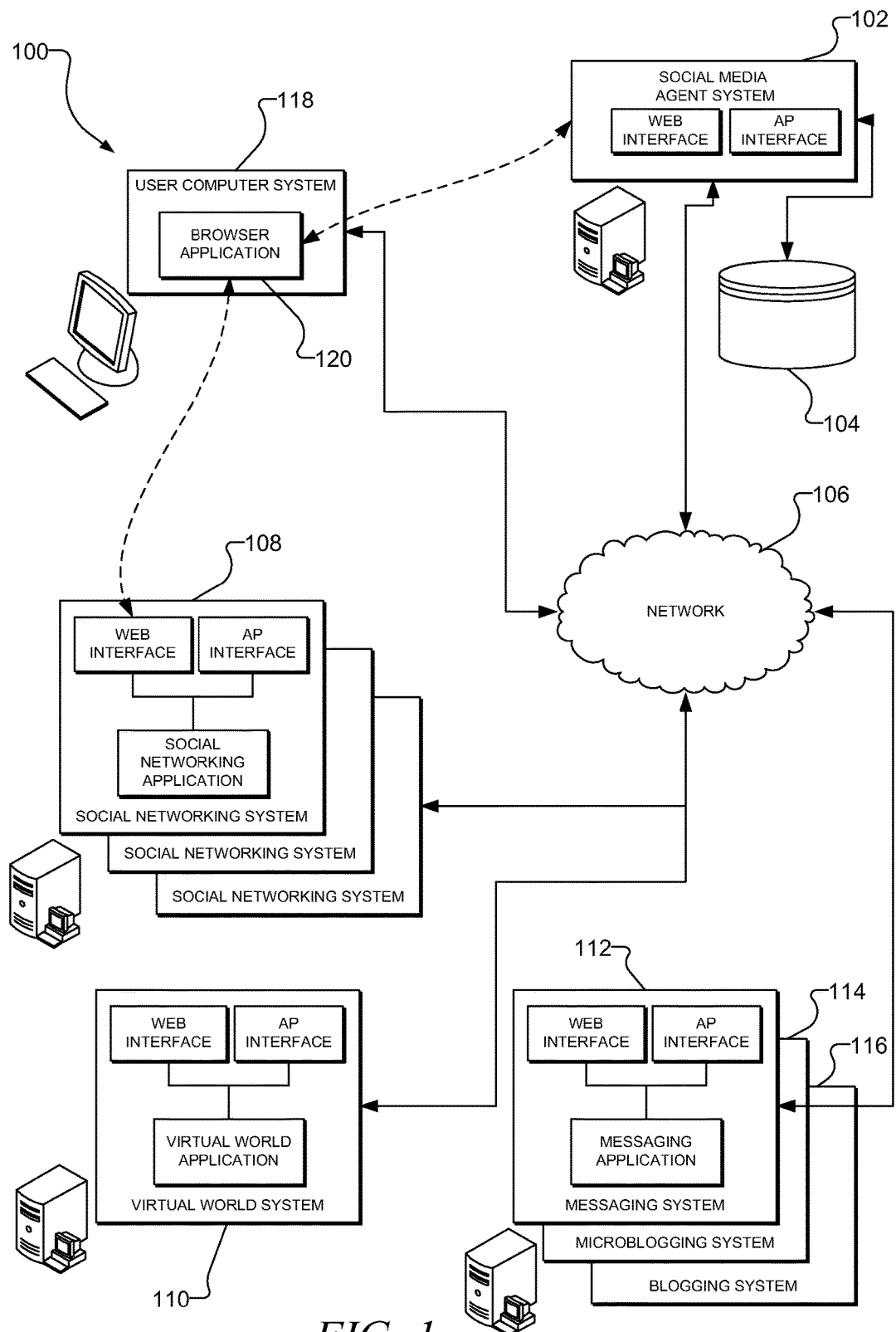
FIG. 1 is a block diagram of a network environment within which a social media agent system, according to some example embodiments, may be deployed.

In the following description, for purposes of explanation, numerous specific details are set forth in order to provide a thorough understanding of some example embodiments. It will be evident, however, to one skilled in the art that the present invention may be practiced without these specific details.

According to some example embodiments, there is provided a social media agent, hereinafter conveniently referred to as a social media robot or "bot", which may operate as a user-controlled, semi-autonomous, or fully autonomous representative entity of a user across multiple social media platforms or systems. A social media agent may be operated by a user directly, or may act autonomously on behalf of a user in both real-time and offline. An autonomous agent may include capture logic that operates to sense and record captured data describing actions relating to a user across one or more social media systems. Specifically, capture logic may operate to sense environmental and contextual data (e.g., within a particular social media platform) pertaining to a social media system in which a user and/or an associated autonomous agent is acting (e.g., to "see" objects in a virtual world environment or "hear" speech in a chat room). The sensory input that is detected by the control logic may then be recorded and made available for processing. An autonomous agent may also include action logic that operatively controls actions performed by the autonomous agent within the context of one or more social media platforms, based on both real-time and historic data recorded by the capture logic. As such, the autonomous agent's actions may be controlled by the action logic in an autonomous way, rather than always being directly controlled by a human user. Various social media platforms (e.g., social networking platforms and virtual worlds) provide Application Program Interfaces (APIs) that enable the control logic of an autonomous agent to perform such sensory recording and programmatic control. Consider for example that Linden Labs provides an extensive set of APIs to the Second Life virtual world. The activities performed by an autonomous agent may include processing of input collected by an autonomous agent and transmitted via an API, and controlling of the autonomous agent via such APIs.

According to our first example aspect, there is provided a social media agent system that includes a capture module configured to capture data describing actions related to a user across multiple social media systems or platforms, a storage module configured to store the captured data in a database, and an interface configured to provide access to this captured data.

The captured data may include user behavior data pertaining to actions performed by (or on behalf of) the user across the plurality of social media systems, or behavior data pertaining to actions relating to the user performed by (or on behalf of) a further user across the plurality of social media systems. The captured data may further include attributes relating to actions performed by or on behalf of the user or the further user. These attributes may include a media attribute identifying at least one of the multiple social media systems to which a particular action relates, a temporal attribute identifying a date and time at which a particular action occurred, an action entity attribute identifying an entity (e.g., the user or a further user, or representative thereof) as having performed a specific action, a related entity attribute identifying an entity to which the specific action relates, and a type attribute identifying a type of action for the specific action.

The storage module is furthermore configured to deduplicate data items of captured data (e.g., by the comparison of newly-acquired captured data with a previously-stored captured data, or by comparisons of previously-stored captured data with other previously-stored captured data). The storage module may furthermore be configured to identify a first data item, relating to a first user, and a second data item, relating to at least one further user, as being duplicate (or at least partially duplicate) data items. The captured data, in some example embodiments, may be constituted by data items relating to at least one of: behavior data relating to actions performed in connection with at least one of multiple social media systems, content data for content generated or identified by a user within the context of at least one of multiple social media systems, and entity data identifying an entity with which a user (or autonomous agent acting on behalf of the user) has interacted in the context of at least one of multiple social media systems.

The storage module may furthermore be configured to store the captured data based on an assessed relevance of the respective data items. To this end, the storage module may be configured to assess the relevance of data items according to a plurality of relevancy rules, which in turn are based on attributes of a data item.

The system may further include a charge module to determine a storage charge relating to the storage of captured data, and to charge a determined storage charge to a user.

The system may further include a rules database configured to store a plurality of social media rules (e.g., behavior rules) associated with a particular user.

According to a further aspect, the system includes a rules database that is configured to store programmatic controls, in the example form of a plurality of social media rules (e.g., behavior rules) associated with a user. In other embodiments, the programmatic controls may be primitives, programs, scripts or applets. The system may further include an autonomous agent module that is configured to perform autonomous activities, on behalf of the user, relating to at least one social medium of a plurality of social media systems, based on at least one of the multiple social media rules or captured data. The autonomous agent module may be configured to perform the autonomous activity in response to a condition expressed by at least one of the multiple social media rules. The condition may be dependent on historical events recorded in the captured data, and the condition may relate to at least one of a user activity reflected in a user behavior data, contextual data, a temporal condition, a third-party action relating to a social medium, or an automated action relating to a social medium.

The autonomous agent may furthermore be configured to perform autonomous activities across two or more of the multiple social media systems. The autonomous agent may furthermore be configured to access captured data, stored in the database, via an interface.

In a further example embodiment, the autonomous agent module may include agent interfaces to facilitate interactions between multiple instantiated autonomous agents that function as representatives of respective users across multiple social media systems. The agent interface may be configured to enable a transfer of data items of captured data between a particular instantiated autonomous agent, and a further instantiated autonomous agent, each of the instantiated agents representing a respective user.

A rule for a particular user may be specific to a social medium of multiple social media systems. Further, a rule may also be applicable across multiple media of multiple media systems.

The system may, in some example embodiments, further comprise an artificial intelligence module that is configured automatically to modify social media rules based on data captured from one or more social media systems.

The system may further include a graphical user interface configured to facilitate access to captured data by a user, and/or a programmatic interface configured to facilitate access to the captured data by an automated process or system.

Example embodiments may find application across many types of different social media systems, including social networking systems, professional networking systems, virtual world systems, messaging systems and blogging systems, to name a few examples.

FIG. 1 is a block diagram illustrating an environment 100, within which an example embodiment of a social media agent system 102 may be deployed. The social media agent system 102 is communicatively coupled to one or more databases 104 in which are stored captured data, behavior libraries, social law rules, relevancy rules, and storage charges and credits, to name a few examples.

The social media agent system 102 is coupled via a network 106 (e.g., the Internet) to multiple social media systems. These social media systems include social networking systems 108, virtual world systems 110, messaging systems 112, microblogging systems 114 and blogging systems 116. The social media agent system 102 may of course be connected to other types of social media system, and to any number of social media systems of a particular type. Each of the various types of social media systems is shown, in the example embodiment, to include both a web interface to generate webpage interfaces to users, and APIs to enable programmatic access to the relevant system.

The social media agent system 102 is further communicatively coupled, via the network 106, to one or more user computer system(s) 118, which hosts client applications, an example of which is a browser application 120. Using the browser application 120, a user may access the respective web interfaces of any one of a number of social media systems 108-116, as well as a web interface of the social media agent system 102.

Figure 2:
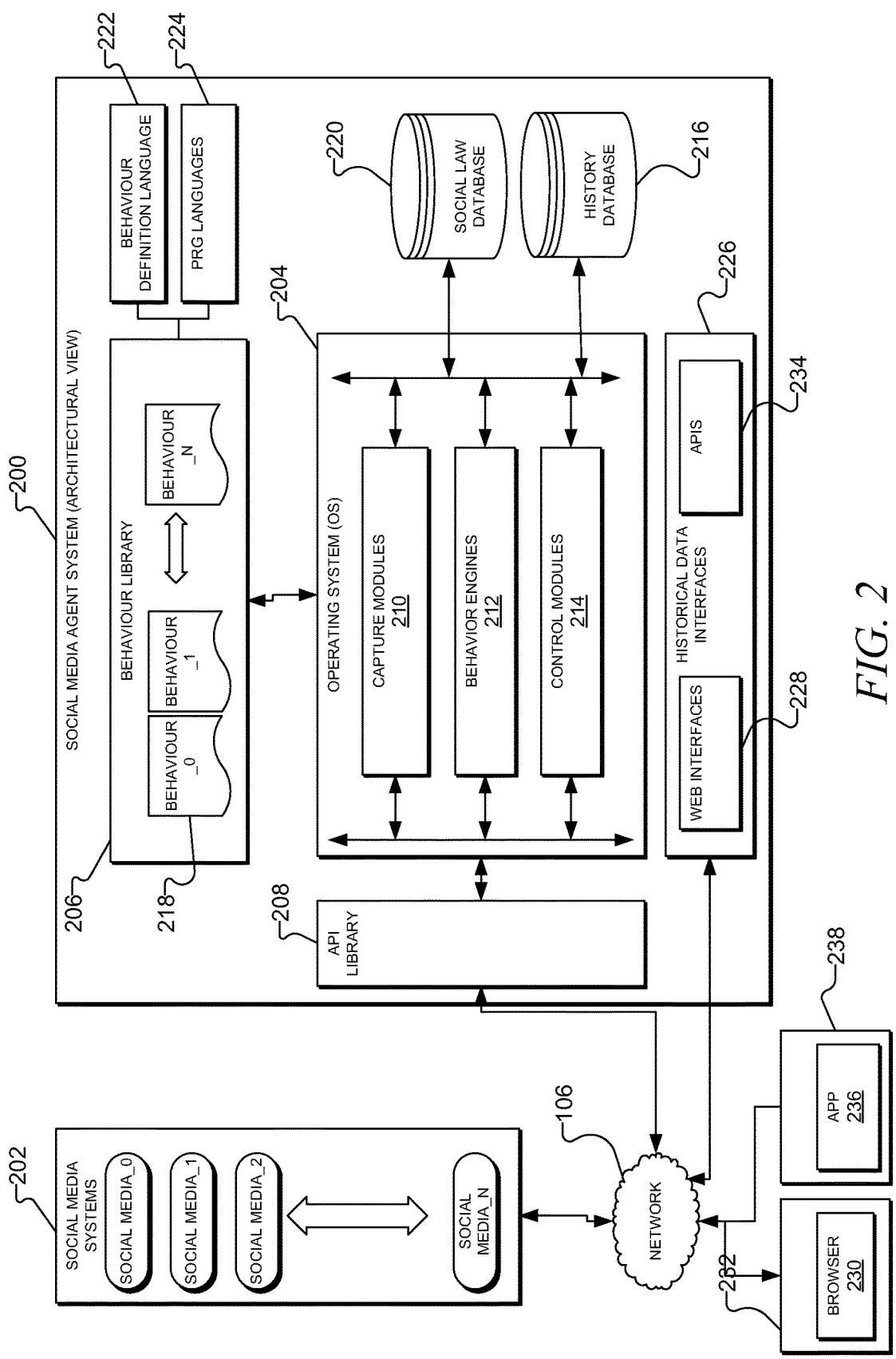
FIG. 2 is a block diagram providing an architectural view of a social media agent system, according to some example embodiments.

FIG. 2 is a block diagram providing an architectural view of a social media agent system 200, according to some example embodiments. The social media agent system 200 is communicatively coupled to multiple social media systems 202, for example of the types discussed above.

The social media agent system 200, in one example embodiment, includes operating system 204, a behavior library 206 and an API library 208. The operating system 204 may support a number of components and modules which may be logically assembled into autonomous agents, as discussed below in further detail with reference to FIG. 3. Each of the autonomous agents may be associated with, and act on behalf of, a specific user of the social media agent system 200.

The components of the operating system 204 may include capture modules 210, behavior engines 212 and control modules 214. A capture module 210 may be configured to operatively identify, capture, store and access historical information in a history database 216. A behavior engine 212, in one example embodiment, is configured to operatively perform autonomous (or semi-autonomous) activities on behalf of a user relating to at least one of the multiple social media systems 202, based on the historical information stored within the history database 216 and one or more rules, in the example form of behaviors 218, stored within the behavior library 206. Actions and activities performed or instructed by the behavior engine 212 may furthermore be constrained by social constraints, expressed in the form of social "laws" stored within a social law database 220.

Behaviors 218 within the behavior library 206 may be altered using a behavior definition language 222, or any one of a number of other well known programming languages 224.

The social media agent system 200 additionally provides a number of captured data interfaces 226 to access captured data stored within the history database 216. Specifically, one or more web interfaces 228 provide browser applications 230, executing on client machines 232, with access to the captured data stored within the history database 216. Similarly, APIs 234 of the captured data interfaces 226 provide programmatic applications 236, executing on remote devices 238 (e.g., server machines), with access, via the network 106, to the captured data within the history database 216.

The web interfaces 228 may provide a user with a dashboard view that summarizes captured data gleaned from the multiple social media systems 202. This information may include various user-configurable summaries, as well as alerts regarding specific actions or observations. For example, the summaries may be summaries of activities with respect to specific applications, functions or locations of any one or more of the social media systems 202. A summary may, for example, be provided of activities (e.g., communications, and other interactions) relating to a further user (e.g., a child) across one or more of the social media systems. Such a summary provides a parent user with a summary of activities of one or more of their children (e.g., child users) across multiple social media systems. In one example embodiment, summaries that are presented to a user may be configured, using the control module 214, to only include the summarized activities of a particular user with respect to further users (e.g., an entity with which a parent user may not wish a child user to have any interactions), or activities of a certain type (e.g., photo posting activities). Other types of filters may be provided by the control module 214 with respect to both summaries and alerts. Such filters may include frequency filters (e.g., only a certain frequency of a certain type of activity and/or with respect to a further user may be included in a summary) or time period filters (e.g., only activities of a certain type, or involving a certain further user, which occur within a predetermined time window are included in the summary and report).

Figure 3:
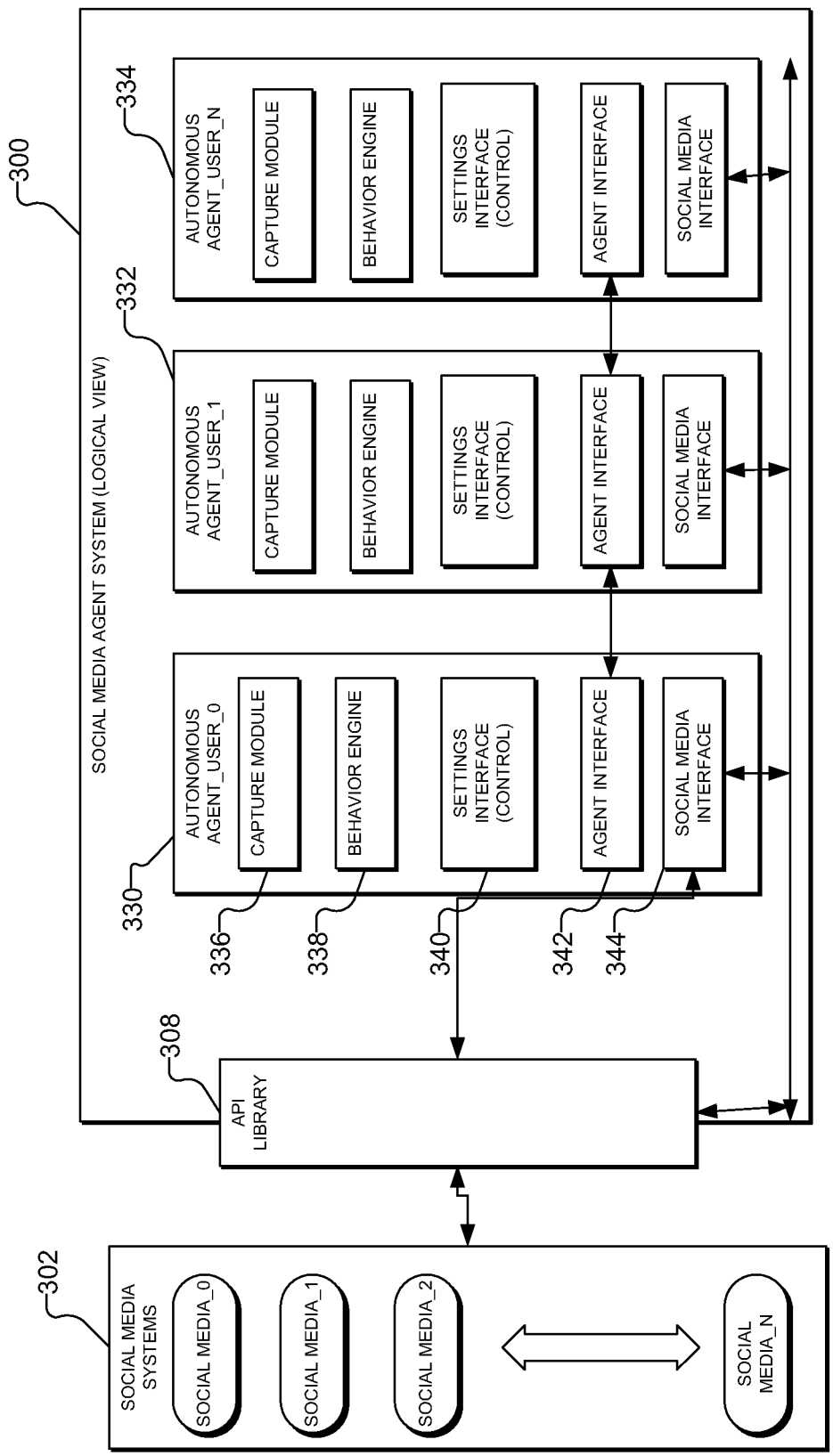
FIG. 3 is a block diagram providing a logical view of a social media agent system, according to some example embodiments.

FIG. 3 is a block diagram providing a logical view of a social media agent system 300, according to some example embodiments. In the logical view, the social media agent system 300 is shown to comprise multiple autonomous agents 330, 332 and 334, each of which is communicatively coupled, via an API library 308, to one or more social media systems 302. Each of the autonomous agents 330-334 includes components corresponding to the operating system components described above with reference to FIG. 2. Each of the autonomous agents 330-334 is furthermore associated with a user of the social media agent system 300. In some embodiments, a single user may have multiple autonomous agents that are representative, and operate across the social media systems 302, on behalf of the respective user.

Taking autonomous agent 330 as an example, this agent 330 includes a capture module 336 (e.g., corresponding to a capture module 210 in the architectural view of FIG. 2), a behavior engine 338 (e.g., corresponding to a behavior engine 212 in the architectural view of FIG. 2), and a settings interface 340 (e.g., corresponding to a control module 214 in the architectural view of FIG. 2). The agent 330 also includes an agent interface 342 via which the autonomous agent 330 can interface with other autonomous agents, such as autonomous agent 332. Further, a social media interface 344 enables the autonomous agent 330 to interface with multiple social media systems 302, using the API library 308.

Figure 4:
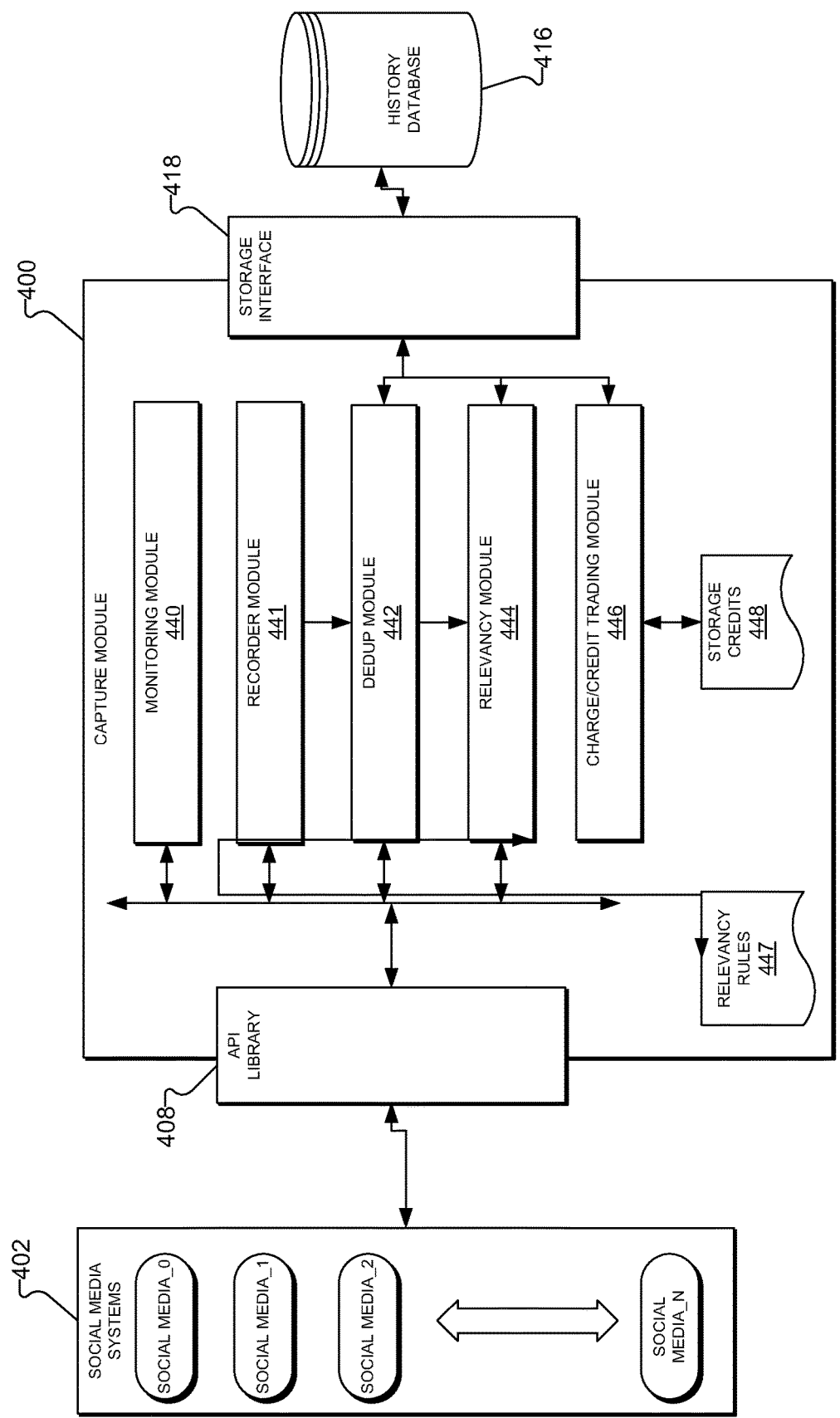
FIG. 4 is a block diagram illustrating an architecture of a storage and access module, according to some example embodiments, which may in turn form part of a social media agent system.
Figure 5:
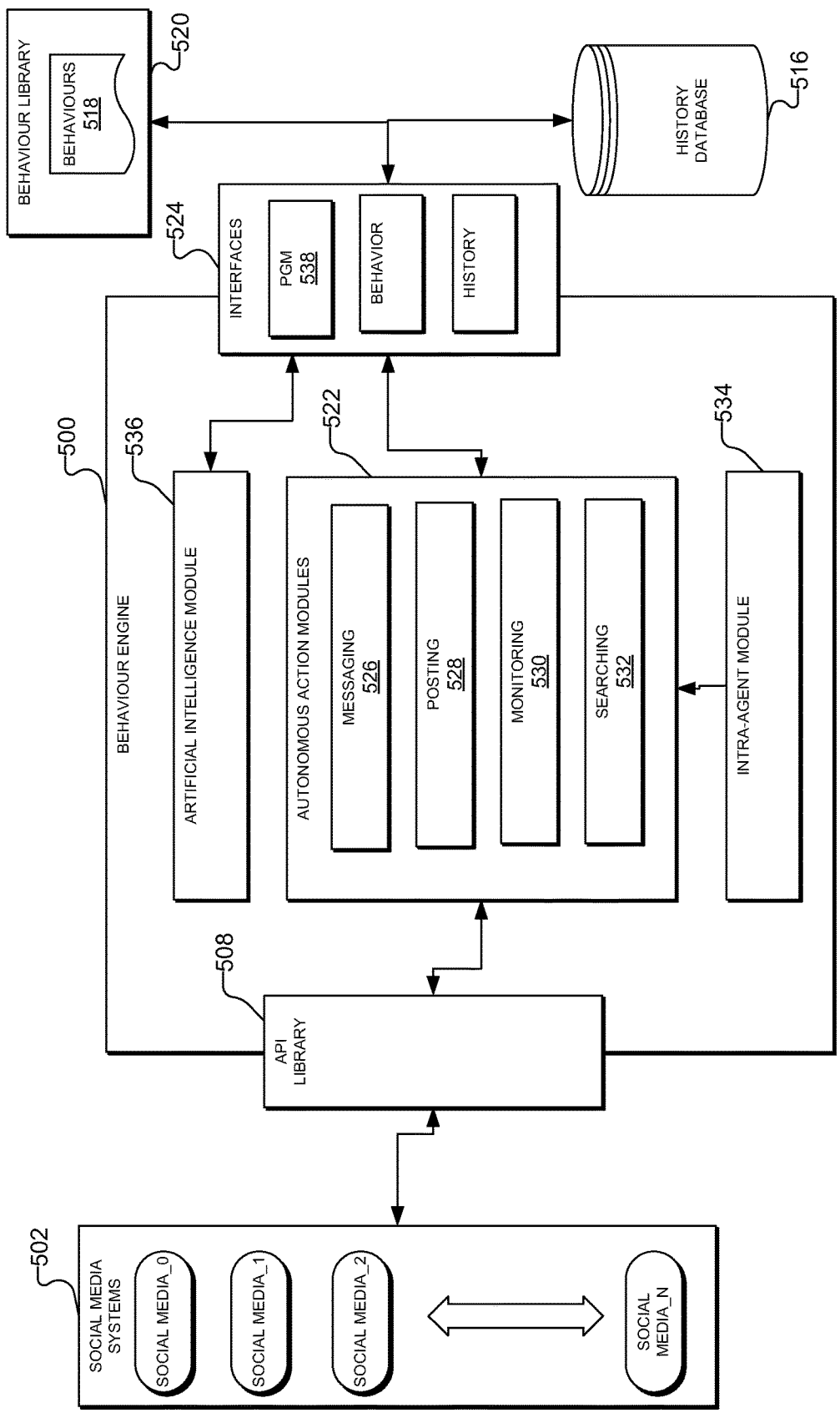
FIG. 5 is a block diagram illustrating architecture of a behavior engine, according to some example embodiments, which may in turn form part of a social media agent system.

Further information regarding a capture module and a behavior engine, according to some example embodiments, will now be provided with reference to FIGS. 4 and 5.

FIG. 4 is a block diagram illustrating further architectural details of a capture module 400, according to some example embodiments. The capture module 400 provides an infrastructure to enable an autonomous agent to store and access historical information pertaining to a user across one or more social media systems 402 to which the capture module 400 has access via an API library 408. The capture module 400 may be regarded as operatively "shadowing" an autonomous agent, and collecting and organizing information regarding observations, interactions and activities of the respective autonomous agent. It will be appreciated that the recording of historical information pertaining to observations, interactions and actions of an autonomous agent is a non-trivial tasks. For example, collective captured data may include a time-stamped list of applications invoked, functions used and locations visited by an autonomous agent across multiple social media systems 402 of varying types. Where an autonomous agent operates with respect to a social media system 402 in the example form of a social networking system (e.g., Facebook), the capture module 400 may record and time-stamp the information regarding various communication activities (e.g., chat, messaging, posting), third-party applications hosted on the social networking platform with which the autonomous agent may have interacted (e.g., an online game posted on a social networking platform), or the profiles of other users that were viewed or accessed by the autonomous agent.

Considering a further example wherein the social media system is a virtual world, the data captured may include a time-stamped list of virtual locations visited by the autonomous agent, avatars that were encountered and communicated with, and activities engaged in, and actions performed, by the autonomous agent or user (via an avatar) within a virtual world. It will be appreciated that the amount of information included in such a time-stamped list may be significant. For example, an avatar which is operating under the control of an autonomous agent may be associated with several dozen virtual properties within a virtual world. At each of these properties, the relevant avatar may encounter many other avatars, as well as a large number of virtual objects. The details of objects and entities that an avatar may encounter as it traverses a virtual world may be captured as "snapshots" by the capture module on a periodic basis. If one considers the situation in which a large number of avatars are operating with autonomous agents, each of which is capturing environmental and activity snapshots with relative frequency (e.g., every few seconds), it will be appreciated that the amount of data captured is significant. For example, chat records, visual scene representations, etc., need to be stored at every snapshot, and the storage demands in this case may be substantial. For this reason, in one example embodiment, the capture module 400 includes intelligence that focuses storage on "relevant" information, and that seeks to avoid the duplication of information captured by various autonomous agents associated with respective avatars. In some example embodiments, limits may be placed on the amount of information that is captured by a particular capture module 400 associated with a particular autonomous agent. Such limits may allow capture activities to be prioritized (e.g., by focusing on certain virtual properties, or automatically expunging older records). In one embodiment, the capture module 400 may also be provided with capabilities to support charging for storage beyond a certain capacity, and to allow autonomous agents to trade or negotiate for storage rights.

The data captured by a capture module 400 may furthermore be spatio-temporal in nature. For example, considering one example in which the social media system 402 is a virtual world system, it may be useful to capture trajectories to represent the location of an avatar, associated with a particular autonomous agent, in consecutive time-stamps. The indexing and querying of spatio-temporal databases is complex, particularly if the temporal axis is chosen as the primary axis, as the valuation of spatial predicate becomes inefficient, and vice versa. In one example embodiment, a Historical R-tree may be deployed as an index, and in which a collection of spatial indexes (namely R-trees) are used for each time-stamp. To minimize duplications, later trees may share nodes with earlier-created trees, provided that the corresponding objects remain stationary. However, long trajectories or objects moving at different speeds can affect query efficiency negatively. A further approach may represent a moving object in dual space as a stationary object. For example, a moving object in a 2-D space may be transformed to a point in a 4-D space, where the two additional dimensions correspond to the object's velocity in the x and y axes respectively.

Queries in spatio-temporal databases may involve captured data (e.g., "find all cars that were in the city center between 2:00 p.m. and 3:00 p.m. yesterday"). Queries may also be predictive, if a motion patent is known (e.g., "find all aircraft expected to appear in Washington's base in 10 minutes from now"), and may involve predicates about topology, distance and direction. More advanced queries may be used to retrieve some of the trajectories, or to mine frequent spatio-temporal patterns.

Data captured via a capture module 400 may also contain information about events, actions, verbal and textual communications, surroundings, applications, etc., in addition to spatio-temporal data. The processing of such additional data may be implemented using indexing methods, meta-data management and query languages.

It should also be kept in mind that properties or attributes monitored, observed, sensed or detected by the capture module 400 between consecutive time-stamps may be unchanged, and it may therefore be inefficient to constantly rerecord these identical property values. An example embodiment records only changes in attribute values, and infers the value of an attribute y at a given time by the most recent value change. Such an example embodiment may adopt the use of a so-called "Time Map", which is a temporal database that embraces default persistence in order to avoid rerecording constant property values.

A capture module 400, in addition to recording captured data pertaining to actions of an autonomous agent and/or user (or, in a context of a virtual world, an avatar under control of the autonomous agent and/or user), may also capture data regarding the actions and context of other autonomous agents and/or users (e.g., represented by avatars in a virtual world, or acting directly within the context of a social networking system). For example, if a first autonomous agent knows that a second autonomous agent has performed a certain action or visited a specific application/function/location that is unknown to the first autonomous agent, the first autonomous agent may query the second autonomous agent in connection with respect to the unknown application or location. For example, within the context of a social networking platform, an autonomous agent may perform a particular activity, on behalf of a user, with respect to a particular function provided by the social networking platform, or with respect to a particular application hosted by the social networking platform. In the context of a virtual world, a particular avatar may have visited a virtual application not previously visited by a specific avatar.

Through such querying by one autonomous agent of another autonomous agent regarding unknown data, certain example embodiments seek to avoid the replication of data captured by one autonomous agent by another. To this end, one embodiment may use an efficient hierarchical, multi-agent captured database in order to avoid such replication. One example approach is to extend "Time Maps" to a multi-agent environment.

In order to support the various functions of the capture module 400 described above, the capture module 400 is shown in FIG. 4 to include a number of functional components. A monitoring module 440 operatively monitors, senses and/or detects contextual information with respect to a particular activity or action performed by an autonomous agent, such as the agent 330. The contextual information that is monitored and detected via the monitoring module 440 may vary, depending upon the social media system within which the autonomous agent is active. Consider a messaging system (e.g., web-based email system). In such a social media system 402, information regarding the addressees of a message, as well as the content of a particular message, may be monitored, parsed and extracted. Within the context of a social networking system, a particular type of interaction may be monitored and detected (e.g., chat, messaging, posting, photo upload, etc.), as well as entities involved in the interaction (e.g., a particular friend, group of friends or network), and the content of the communication. Within the context of a virtual world system, a virtual world location, objects and activities related to the virtual location may be sensed and detected. In one example embodiment, contextual information sensed and detected by the monitoring module 440 may be pre-configured within the operating system 204. In a further embodiment, user controls may be provided (e.g., via the control module 214) which allow a user to specify which contextual information should be monitored/sensed/detected for each of multiple social media systems 402.

In one example embodiment, the monitoring module 440 may differentiate between different types of captured data. Specifically, the monitoring module 440 may differentiate between (1) captured data reflecting actions, activities and context for an autonomous agent (or user) with which the capture module 400 is directly associated, and (2) observed captured data pertaining to third-party autonomous agents (users or entities). The monitoring module 440 may detect direct behavior data pertaining to actions performed by, or on behalf of, an associated user across multiple social media systems 402 and third-party behavior data pertaining to actions performed by or on behalf of further users across the multiple social media systems 402.

The captured data sensed or detected by the monitoring module 440 may also relate to specific attributes, these attributes again being particular or specific to a particular social media system 402. Example attributes, relating to actions performed by, or on behalf of, an associated user or another user may include the following:

A media attribute, identifying a particular social media system 402, or a type of social media system 402 to which a performed or observed action relates;

A temporal attribute, identifying time and date at which a performed or observed action/activity occur;

A user attribute identifying a user (e.g., an associated user or a further user) having performed that action;

An entity attribute, identifying an entity (e.g., user) or environmental entity (e.g., a virtual world object) to which a particular action relates; and A type attribute, indicating a type of action for the observed action (e.g., receive, send, move, collect, block, etc.)

It will be appreciated that the specific attributes may have been numerous, and vary substantially from social media platform to social media platform.

The captured data sensed and detected by the monitoring module 440 may furthermore be captured as unique data items that are classified broadly into a number of categories, examples being:

Behavior data, relating to actions performed or observed in connection with one or more of the multiple social media systems 402;

Content data, reflecting content generated or identified (or observed to be generated or identified) by a user within the context of one or more social media systems 402; and Entity data, identifying an entity that performed or observed a particular behavior, or generated or observed the generation of a particular content, or with which a user has interacted in the context of one or more social media systems.

Considering the example of a messaging system, a first user, acting directly through an autonomous agent, may generate a message content, which is then transmitted to a second user. In this example, the behavior data, with respect to a sending user, may indicate a "send" action as a behavior. The content data relating to this activity may include the content of the message, and entity data may identify the sender and recipient users of the message.

A recorder module 441 is configured to record information that is monitored, detected and extracted by the monitoring module 440.

A deduplication module 442, in one example embodiment, seeks to avoid the storage of duplicate information within a history database 416. In one example embodiment, the deduplication module 442 may deploy the "Time Maps" described above, as a form of a temporal database that uses default persistence to avoid the storage of identical property values for various attributes. In other embodiments, hashes of previously-stored captured data may be compared to hashes of currently received captured data in order to assess whether changes with respect to particular attribute values have occurred. The storage of fresh attribute values may be predicated upon detecting a change between successive "snapshots" of attribute values. In further example embodiments, and as alluded to above, newly received captured data retrieved for one particular agent with respect to a specific social media platform may be compared to historical information previously received from another agent active on the same social media platform. If the relevant captured data (or at least a portion thereof), is determined to have been previously captured by another agent, the previously captured information may be associated with the current autonomous agent, in order to reduce the storage of duplicate information within the history database 416.

A relevancy module 444 is configured to operatively assess the relevance of data that has been sensed/detected by the monitoring module 440, and determined not to be duplicate or redundant data by the deduplication module 442. In this sense, the relevancy module 444 may seek to prioritize storage of data items comprising captured data within the history database 416. The relevancy module 444 may assess the relevancy of a particular data item (e.g., a snapshot) based on one or more relevancy rules 447. Certain relevancy rules, for a particular autonomous agent, may be applied across multiple social media systems 402, whereas other relevancy rules 447 may be specific to a particular social media platform. Certain relevancy rules 447 may constitute a part of the operating system 204 and may be "built in" relevancy assessments. Other relevancy rules 447 may be user-definable through the control module 214.

A charge/credit trading module 446, in one example embodiment, is configured to operatively monitor an amount of storage consumed within the history database 416, by captured data associated with a particular autonomous agent or user. To this end, predetermined thresholds of storage within the history database 416 may be specified on a per agent/user basis. In the event that storage thresholds are exceeded, the charge/credit trading module 446 may implement a charge against an account (not shown) of a user for the additional storage. To this end, the charge/credit trading module 446 is configured to maintain storage credits 448 for each agent/user indicating a number of storage credits 448 (e.g., purchased additional storage or unused storage capacity) that are attributable to a particular user. In one example embodiment, the module 446 may further enable users to trade storage capacity, using storage credits 448 as a currency.

FIG. 5 is a block diagram illustrating further architectural details of a behavior engine 500, according to some example embodiments. The behavior engine 500 is configured to perform autonomous activity on behalf of a user, relating to at least one of multiple social media systems 502, based on captured data maintained within a history database 516, and behaviors 518 stored in a behavior library 520. Specifically, the autonomous activities may be performed by a collection of autonomous action modules 522 that access the behavior library 520 and the history database 516 via interfaces 524. Example modules that may be included in the autonomous action modules 522 include:

A messaging module 526 that is configured to compose, transmit, receive and process messages (e.g., emails, chat messages, SMS, etc.) on behalf of a user.

A posting module 528 that is configured to post content (e.g., photographs, advertisements, comments, music, links to internet content, etc.) to appropriate resources made available by one or more of the social media systems 502.

A monitoring module 530 that is configured to automatically and/or autonomously monitor activities across one or more of the social media systems 502. To this end, the monitoring module 530 may provide instructions to the capture module 440 regarding events, activities, entities and other contextual information that should be included in a "snapshot" of contextual information gathered by the capture module 400. Further, the monitoring module 530 may operate, under the direction of rules expressed in one or more behaviors 518, to instruct a further autonomous action module of the modules 522 to perform a specific autonomous action based on data received from the capture module 400;

A searching module 532 that is configured operationally to search one or more of the social media systems 502 for specific information that may be identified in one or more behaviors 518. For example, the searching module 532 may periodically search and identify a resource (e.g., an email archive, posting by friends on a social network system, or a virtual world location) in which to locate a specified communication, entity or activity.

The behavior engine 500 may further include an intra-agent module 534 to facilitate communications and transfer of data between an autonomous agent (which the behavior engine forms a part) and other autonomous agents (e.g., using an agent interface 342).

An artificial intelligence module 536 is configured to automatically modify behaviors 518 (as examples of social media rules) based on captured data, either retrieved in real time by the capture module 400, or retrieved from the history database 516.

In some example embodiments, the autonomous activities or actions performed by the behavior engine 500 may be programmed in one of a number of different ways. To this end, the interfaces 524 may include one or more programming interfaces 538 (e.g., APIs) using which programs may be written in any one of a number of languages (e.g., Java or C++) to implement behavior on the behavior engine 500. In one example embodiment, three levels of automation may be provided, including (in order of increasing sophistication), built-in parameters, one or more behavior libraries 520, and a specialized scripting language.

Considering first built-in parameters, the APIs of a social media system 502 (e.g., a virtual world system) may give rise to a basic set of primitive commands that may be issued, for example using an API library 508. These commands may include actions that are generic to a specific social media platform (e.g., go to location X), but also actions that may be specific to a particular social media system 502 (e.g., "grab the treasure") given a specific location (e.g., by an item at a given price). Beyond parameters of various APIs, a primitive command may specify conditions under which the API may be invoked. Two example cases may be a condition-response case, and or a time-scoped case. An example condition-response may, with respect to a virtual world system, state the following: "If an avatar with XYZ properties arrives at location ABC, greeted with the phrase RST". In a special case, the condition may be empty (i.e., always satisfied). Regarding a time-scoped case, in addition to a condition, a user may specify a time window during which a particular action is valid. As a special case, the time window may be a specific time. Further, a graphical user interface (GUI) may have a user select the time-scope, the condition and a built-in action, including relevant parameters.

Turning now to an example behavior library 520, an initial set of behaviors 518 may be supplied as part of the operating system 204. From a user's perspective, the behaviors 518 may appear to be similar to a bolt-in parameter, although the nature of the behaviors 518 is different from the bolt-in parameters. For example, a set of bolt-in parameters may be finite and fixed, whereas complex behaviors 518 may grow and evolve over time. An operator of a social media agent system 200 may furthermore add behaviors 518 to a behavior library 520. Furthermore, users may be encouraged to create and add additional behaviors 518 to one or more behavior libraries 520 (e.g., as "plug-ins") to the behavior engine. Example behaviors that may be included in the library are Monitor a location: such a behavior may be implemented by the monitoring module 530, and may be generic to monitoring all events pertaining to a location or function across multiple social media systems 502, or any specific events across one or more social media systems 502. To this extent, an autonomous agent may leave copies of itself in multiple locations or in multiple social media systems 502, if multiple locations or multiple social media systems 502 need to be monitored. A monitoring behavior may alert a user in case some pre-defined event occurs (e.g., a message is received, a specific avatar appears, or a lecture begins). Furthermore, the artificial intelligence module 536 may learn over time the types of events, activities or appearances that are of most interest to a particular user, and modify a monitoring behavior accordingly. The learning, by the artificial intelligence module 536, may be based on explicit training by the user, or implicit training based on an analysis of captured data regarding a user's activities.

Track entity: a tracking behavior may track activities of a further entity (e.g., a user or autonomous entity) as it performs the activities with respect to one or more social media systems 502. For example, a particular tracking behavior may track an avatar as it traverses a virtual world and acts in it, summarize its activities and conversations, and alert a user when a specific event occurs. A further monitoring behavior may monitor activities of a particular user on a social networking system, summarize such activities and communications, and alert a further user regarding specific events. Consider for example that parents may wish to monitor activities of a child on a social networking system, such as the Facebook system. In this case, a monitoring behavior may create a summary of the activities of the child on the social networking system (e.g., on a daily, weekly or monthly basis), provide this summary to the parents, and also alert the parents to specific activities of the child (or the child's friends).

Caller behavior: In one example, a caller behavior may traverse a particular social media system 502 to identify and extract certain information regarding that social media system 502. For example, considering a social networking system, a caller may traverse the social networking system to identify postings dealing with a particular topic. Within the context of a virtual world system, a caller behavior may map part of a virtual world, and activities that have occurred within that virtual world.

Locate behavior: In an example embodiment, a location behavior may locate further users (e.g., by name or characteristics (e.g., appearance or past behaviors)), and notify a user when such further users are located.

Categorization behavior: In an example embodiment, a categorization behavior enables a user to specify categories according to which other users of social media systems 502 may be categorized (e.g., friendly, aggressive, family, close friends, acquaintances), as well as a scale on which these categories take on values (e.g., binary, or continuous on a 0-10 scale). In this case, the artificial intelligence module 536 may apply appropriate machine-learning techniques (e.g., decision-tree for discrete attributes or one of several regression techniques for continuous ones) to estimate categories for unlabelled users. A particular user may supply feedback, responsive to which the artificial intelligence module 536 may update a learned model.

As will be appreciated from the various autonomous action modules, behaviors 518 or behavior library 520 may either be passive (e.g., observing or monitoring) or active (e.g., transmitting a message, posting, negotiating a commercial deal, providing a service (e.g., giving a consent of providing information), etc.). In various example embodiments, the behaviors 518 may also be accessed via a GUI (e.g., as in the case of built-in parameters) or via APIs invoked in a script.

The interfaces 524 may also include APIs with which the behavior engine 500 may be programmed. For example, a user may write a program in any number of languages (e.g., Java or C++), and link to libraries implementing the built-in behaviors.

Figure 6:
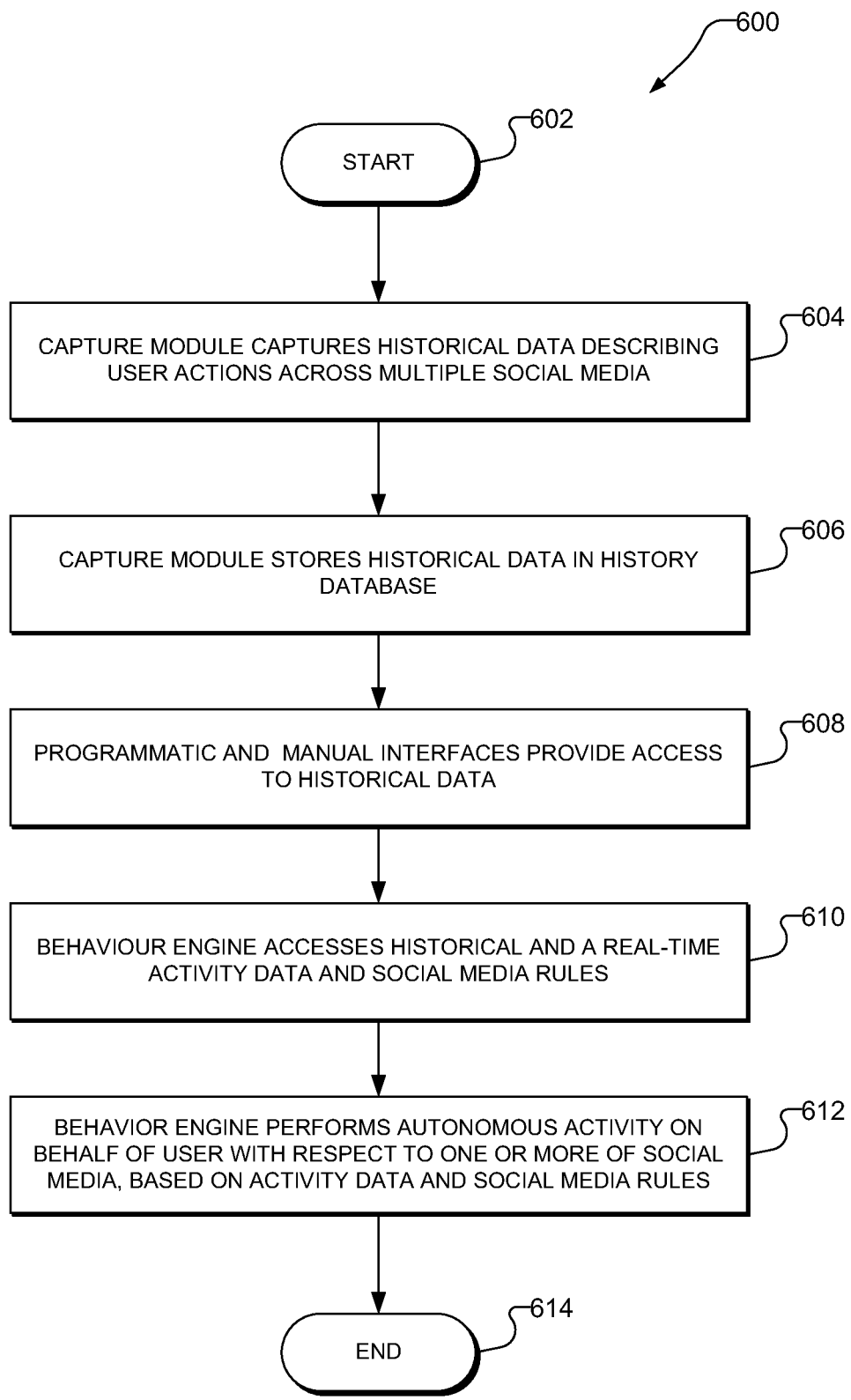
FIG. 6 is a flow chart illustrating a method, according to some example embodiments, to process data and interact across multiple social media platforms using an autonomous agent.

FIG. 6 is a flow chart illustrating a method 600, according to some example embodiments, to process data and interact across multiple social media platforms using an autonomous agent.

The method 600 commences at operation 602, and proceeds to operation 604, where the capture module 400 of an autonomous agent captures data describing actions, activities and context across multiple social media systems. To this end, the capture module 400 may, in some example embodiments, monitor, record, deduplicate, and assess the relevancy of captured data, as described above with reference to FIG. 4. As noted, the captured data may comprise action information describing user actions across multiple social media systems, and contextual information across such multiple social media platforms. The action information may reflect user actions performed by a user, or performed on behalf of a user by the autonomous agent, or observe actions of other users, again performed by those users directly or performed by autonomous agents acting on behalf of those further users. Context information may or may not be coupled to action information and may comprise observations or other sensed and recorded information pertaining to a particular application, function or location within a social media system (e.g., a social networking system, a virtual world system or a messaging system.)

At operation 606, the capture module 400 stores the captured data in the history database 416, via the storage interface 418. Again, the captured data stored at operation 606 may, in some embodiments, have been subject to deduplication and relevancy assessment operations by the deduplication module 442 and the relevancy module 444.

In addition to storing the captured data at operation 606, the charge/credit trading module 446 of the capture module 400 may charge the relevant user, associated with an autonomous agent of which the capture module 400 forms a component, for storage of captured data.

At operation 608, the social media agent system 200 provides interfaces so as to enable access to the captured data stored within a history database. For example, again, referring back to FIG. 2, the web interface 228 and the API 234 of the captured data interfaces 226 may provide access to browser applications 230 and programmatic applications 236, respectively.

As noted above, in addition to providing interfaces to the captured data, certain example embodiments enable a behavior engine 500, and particularly autonomous action modules 522 of the engine 500, to perform autonomous activities on behalf of a user across any one or more of the multiple social media systems 502, based on the captured data and/or social media rules (e.g., behaviors 518). To this end, at operation 610, the behavior engine 500 accesses captured data stored within the history database 516, as well as real-time activity data captured by the capture module 400. At operation 610, the behavior engine 500 may furthermore access social medial rules, in an example form of behaviors 518 (or the built-in primitives or scripted programs discussed above).

At operation 612, the behavior engine 500 then performs one or more autonomous activities, on behalf of a respective user, with respect to one or more of the social media systems 502, based on the captured data (real-time or previously stored), and/or the social media rules. Examples of such autonomous activities are detailed above with reference to FIG. 5.

The method 600 then terminates at operation 614.

Figure 7:
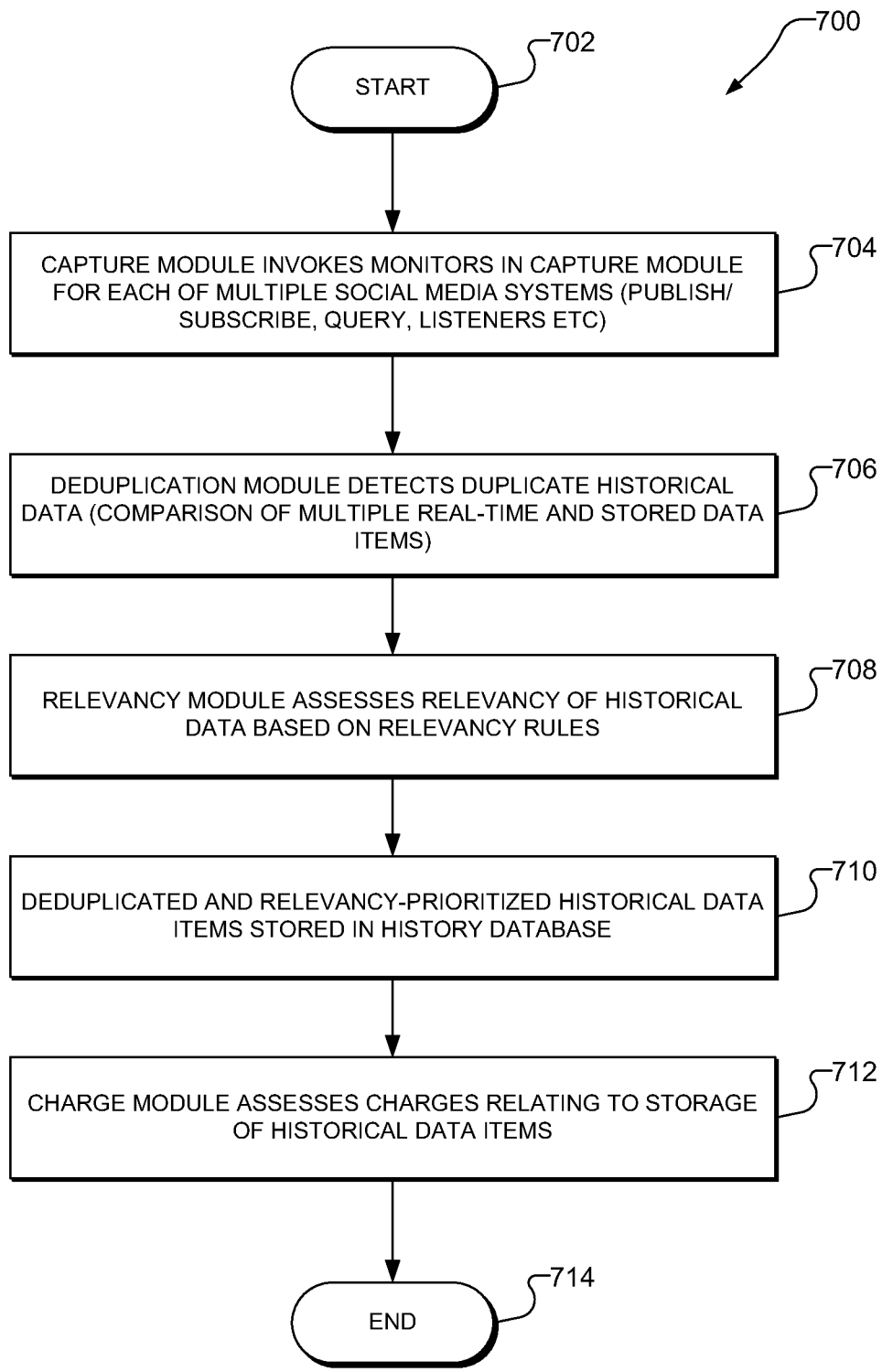
FIG. 7 is a flow chart illustrating a method, according to some example embodiments, to store captured data relating to a user obtained from multiple social media platforms.

FIG. 7 is a flow chart illustrating a method 700, according to some example embodiments, to capture captured data describing activity and context across multiple social media systems, on behalf of a particular user. The method 700 may, in one example embodiment, be performed as part of the operation 604 of FIG. 6.

The method 700 commences at operation 702, and progresses to operation 704, where a capture module 400 invokes one or more monitors (e.g., of a monitoring module 440) in order to sense/detect activity and context information, and to record such historical information. The various monitors, as described above, may use various mechanisms to monitor activity and context information cross-multiple social media systems 402. For example, the monitors may use a publish-subscribe mechanism, a query mechanism or a listener mechanism, dependent upon monitoring resources provided by the respective social media systems 402.

At operation 706, the deduplication module 442 detects duplicate activity and context data, in the manner described above with reference to FIG. 4, and deduplicates this data. The detection of duplicate information may involve a comparison of both real-time and previously stored captured data.

At operation 708, the relevancy module 444 assesses the relevancy of the captured data, based on relevancy rules 447, and prioritizes and/or filters the captured data based on these relevancy rules 447.

At operation 710, the deduplicated and relevancy-prioritized/filtered captured data is stored, via the storage interface 418, into the history database 416.

At operation 712, the charge/credit trading module 446 may assess charges relating to storage of the captured data within the history database 416. For example, this operation may include determining an amount of storage consumed by the storage operation performed at 710, determining a charge or rate applicable on a per unit volume of storage capacity (e.g., a per megabyte charge), and assessing that charge against an account of the user maintained by the social media agent systems 200. In one example embodiment, the user may have storage credits 448 (e.g., as a result of not having reached a threshold storage volume or having pre-purchased certain storage credits). These storage credits 448 may, at operation 712, be applied to offset assessed charges. In a further embodiment, a user may trade storage credits 448 with other users for value. Such value may, for example, relate to the multiple social media systems 402. Consider an example in which a user wishes to acquire a 'virtual world' object within the context of a virtual world system. In this case, storage credits 448 may be traded, via the social media agent system 200, for a transfer of ownership of the virtual world object.

Figure 8:
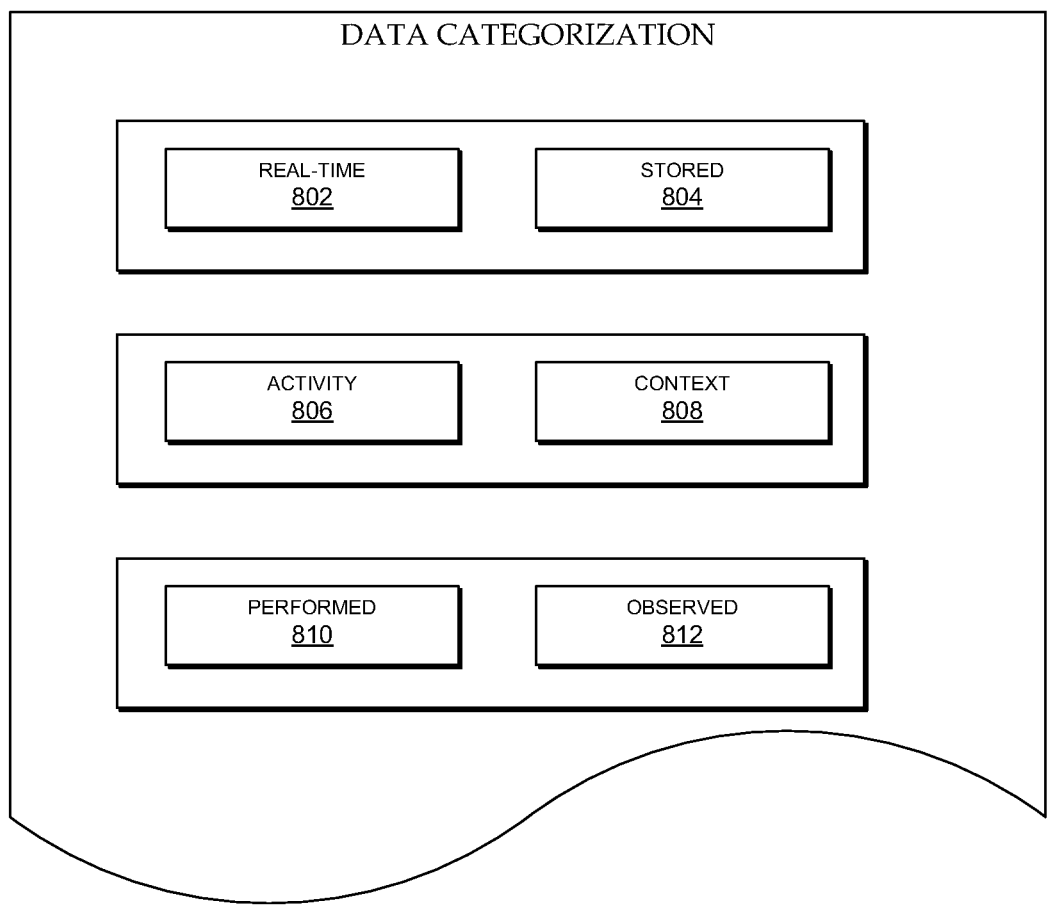
FIG. 8 is a diagrammatic representation of the categorization, according to example embodiments, of captured data.

FIG. 8 is a diagrammatic representation of the categorization, according to an example embodiments, of captured data that is captured by the capture module 400 described above with reference to FIG. 4. As shown, captured data may be classified as being either real-time captured data 802 or a stored captured data 804. Real-time captured data 802 may be a real-time data that is received by a monitor for processing, prior to processing thereof by the capture module 400 and prior to storage within the history database 416. Stored captured data 804 is a data that has been deduplicated, relevancy prioritized (or filtered), and stored within the history database 416 via the storage interface 418.

Captured data may furthermore be classified as activity data 806 or context data 808. Activity data 806 may be a captured data that describes activities performed by (or on behalf of) a user associated with autonomous agent that includes a particular capture module 400, or activities performed by (or on behalf of) a third-party user. Furthermore, the activity data 806 may relate to activities actually performed by the user, or to activities observed to be performed by or on behalf of the user. Similarly, context data 808 is captured data that is contextual to a particular activity, application, function or location that is visited or acted upon by a user, or that is observed to be visited or acted upon by a third-party user. Context data 808 may, for example, comprise identification of a location, actors, virtual objects, time and date information, activity type information, entity type information, media attribute information, etc.

Finally, captured data 800 may also be performed data 810 or observed data 812. For example, performed data 810 may relate to an activity actually performed by, or on behalf of, a specific user. Observed data 812 may relate to activities observed to be performed by, or on behalf of, a third-party user across any one of the multiple social media systems 402.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, a data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field-programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
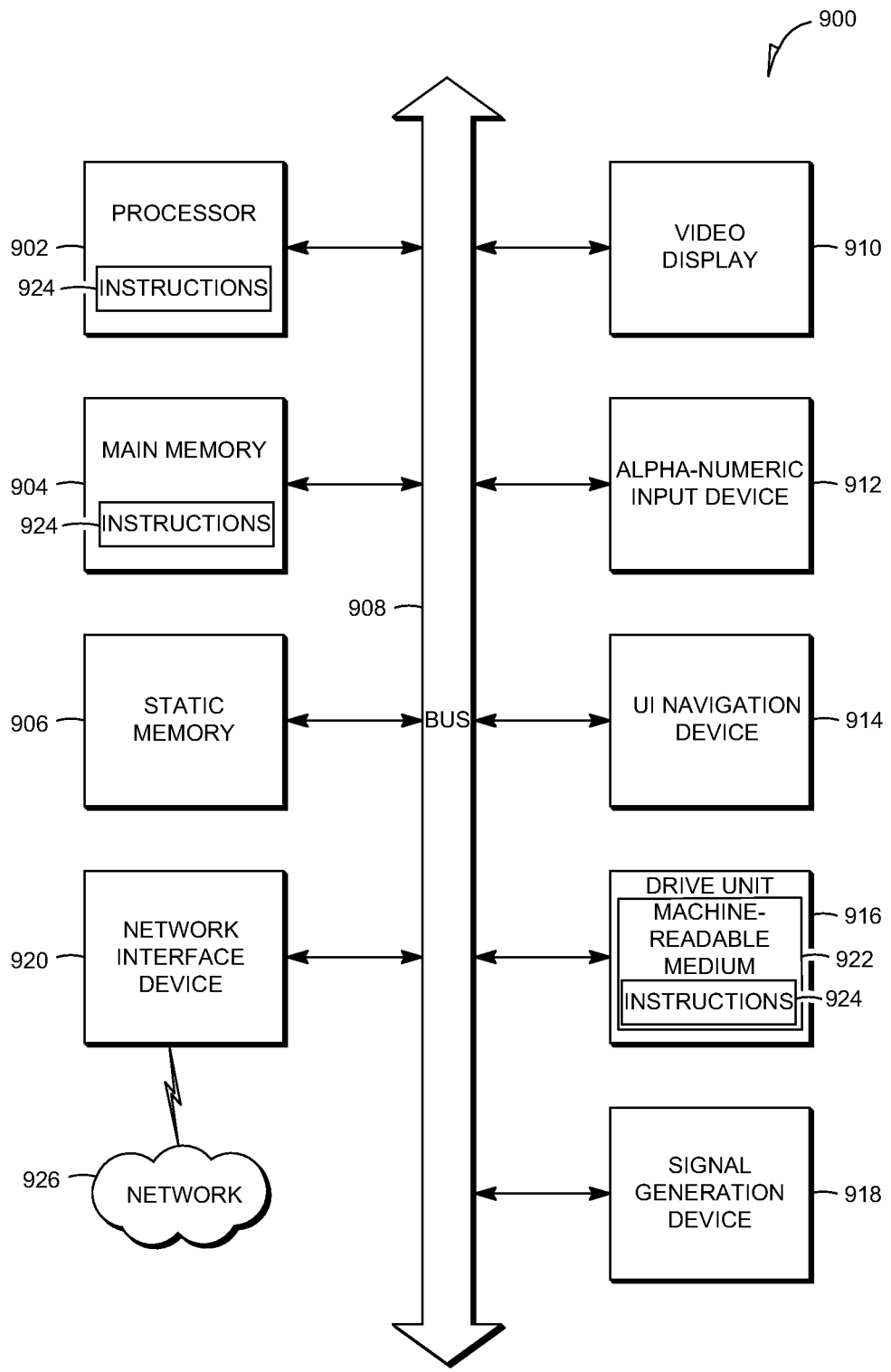
FIG. 9 is a block diagram of machine in the example form of a computer system within which a set of instructions for causing the machine to perform any one or more of the methodologies discussed herein may be executed.

FIG. 9 is a block diagram of a machine in the example form of a computer system 900 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions 924 and data structures (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that causes the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   receiving, by a server, data describing a first set of one or more actions performed by a user on a first social media system of a plurality of social media systems resulting in a first outcome associated with the first social media system;
   identifying, by the server, one or more social media rules associated with the user and stored in a rules database, the one or more social media rules specific to a second social media system of the plurality of social media systems;
   automatically identifying, by the server, a second set of one or more actions to perform on the second social media system on behalf of the user by processing a portion of the data describing the first set of one or more actions performed by the user on the first social media system in view of the one or more social media rules specific to the second social media system; and
   automatically providing, by the server, instructions that when implemented cause a fully autonomous, virtual agent to perform, on behalf of the user, the second set of one or more actions on the second social media system based on the data describing the actions performed by the user on the first social media system, wherein performing the second set of one or more actions results in a second outcome associated with the second social media system that is similar to the first outcome associated with the first social media system.

2. The method of claim 1, further comprising:
   comparing the data with stored data associated with the user to identify at least a portion of the data being non-duplicative of the stored data.

3. The method of claim 2, wherein comparing further comprises identifying a remaining portion of the data as being duplicative in view of the stored data, the method further comprising:
   identifying a first autonomous, virtual agent associated with the data;
   identifying a second autonomous, virtual agent associated with the stored data; and
   associating the remaining portion of the data with the second autonomous, virtual agent.

4. The method of claim 1, further comprising:
   identifying a condition associated with the one or more social media rules; and
   providing instructions that when implemented cause the fully autonomous, virtual agent to perform the second set of one or more actions on the second social media system based on the condition.

5. The method of claim 4, wherein the condition comprises at least one of a user activity reflected in the data, a temporal condition, a third-party action relating to the second social media system, and an automated action relating to the second social media system.

6. The method of claim 1, wherein the instructions cause the fully autonomous, virtual agent to perform, on behalf of the user, a third set of one or more actions on a third social media system based on the data describing the first set of one or more actions performed by the user on the first social media system.

7. The method of claim 1, wherein the one or more social media rules are embodied in an autonomous, virtual agent that functions as a representative of the user across the plurality of social media systems.

8. The method of claim 1, wherein a specific social media rule of the one or more social media rules is applicable to the first social media system of the plurality of social media systems.

9. The method of claim 1, wherein a specific social media rule of the one or more social media rules is applicable across multiple social media systems of the plurality of social media systems.

10. The method of claim 1, further comprising modifying the one or more social media rules based on the data.

11. A system, comprising:
    a computing device; and
    a computer-readable storage device coupled to the computing device and having instructions stored thereon which, when executed by the computing device, cause the computing device to perform operations comprising:
      receiving data describing a first set of one or more actions performed by a user on a first social media system of a plurality of social media systems resulting in a first outcome associated with the first social media system;
      identifying one or more social media rules associated with the user and stored in a rules database, the one or more social media rules specific to a second social media system of the plurality of social media systems;
      automatically identifying a second set of one or more actions to perform on the second social media system on behalf of the user by processing a portion of the data describing the first set of one or more actions performed by the user on the first social media system in view of the one or more social media rules specific to the second social media system; and
      automatically instructing a fully autonomous, virtual agent to perform, on behalf of the user, the second set of one or more actions on the second social media system based on the data describing the actions performed by the user on the first social media system, wherein performing the second set of one or more actions results in a second outcome associated with the second social media system that is similar to the first outcome associated with the first social media system.

12. The system of claim 11, the operations further comprising:
    comparing the data with stored data associated with the user to identify at least a portion of the data being non-duplicative of the stored data.

13. The system of claim 12, wherein comparing further comprises identifying a remaining portion of the data as being duplicative in view of the stored data, the operations further comprising:
    identifying a first autonomous, virtual agent associated with the data;
    identifying a second autonomous, virtual agent associated with the stored data; and associating the remaining portion of the data with the second autonomous, virtual agent.

14. The system of claim 11, the operations further comprising:
identifying a condition associated with the one or more social media rules; and
providing instructions that when implemented cause the fully autonomous, virtual agent to perform the second set of one or more actions on the second social media system based on the condition.

15. The system of claim 14, wherein the condition comprises at least one of a user activity reflected in the data, a temporal condition, a third-party action relating to the second social media system, and an automated action relating to the second social media system.

16. The system of claim 11, wherein the operations further comprise:
instructing the fully autonomous, virtual agent to perform, on behalf of the user, a third set of one or more actions on a third social media system based on the data describing the first set of one or more actions performed by the user on the first social media system.

17. The system of claim 11, wherein the one or more social media rules are embodied in an autonomous, virtual agent that functions as a representative of the user across the plurality of social media systems.

18. The system of claim 11, wherein a specific social media rule of the one or more social media rules is applicable to the first social media system of the plurality of social media systems.

19. The system of claim 11, wherein a specific social media rule of the one or more social media rules is applicable across multiple social media systems of the plurality of social media systems.

20. The system of claim 11, the operations further comprising modifying the one or more social media rules based on the data.

* * * * *